(12) United States Patent
Overbeek et al.

(10) Patent No.: US 6,555,625 B1
(45) Date of Patent: Apr. 29, 2003

(54) CROSSLINKABLE COATING COMPOSITIONS

(75) Inventors: Gerardus Cornelis Overbeek, Waalwijk (NL); Ronald Tennebroek, Waalwijk (NL); Yvonne Wilhelmina Smak, Waalwijk (NL)

(73) Assignee: Avecia BV, Waalwijk (NL)

( * ) Notice: Subject to any disclaimer, the term of this patent is extended or adjusted under 35 U.S.C. 154(b) by 0 days.

(21) Appl. No.: 09/937,098

(22) PCT Filed: Mar. 17, 2000

(86) PCT No.: PCT/GB00/01009
§ 371 (c)(1),
(2), (4) Date: Sep. 20, 2001

(87) PCT Pub. No.: WO00/56826
PCT Pub. Date: Sep. 28, 2000

(30) Foreign Application Priority Data

Mar. 23, 1999 (GB) ................................. 9906619

(51) Int. Cl.$^7$ ............................. C08F 8/30; C08F 8/32
(52) U.S. Cl. ........................ 525/191; 525/217; 525/221; 428/522; 428/423.1; 428/500

(58) Field of Search ............................. 428/522, 423.1, 428/500; 525/191, 221, 217

(56) References Cited

U.S. PATENT DOCUMENTS 5,559,192 A * 9/1996 Bors et al. .................. 525/300

FOREIGN PATENT DOCUMENTS

| EP | 0 332 326 | 9/1989 |
| EP | 0 444 454 | 9/1991 |
| EP | 0 663 412 | 7/1995 |
| EP | 0 705 855 | 4/1996 |

* cited by examiner

*Primary Examiner*—James J. Seidleck
*Assistant Examiner*—Melanie Bissett
(74) *Attorney, Agent, or Firm*—Pillsbury Winthrop LLP

(57) ABSTRACT

An aqueous crosslinkable coating compositions comprising i) an autoxidisably crosslinkable polymer, ii) a not autoxidisably crosslinkable vinyl polymer bearing acetoacetyl groups and iii) acetoacetyl-reactive groups to crosslink the vinyl polymer.

12 Claims, No Drawings

CROSSLINKABLE COATING COMPOSITIONS

This application is the National Phase of International Application PCT/GB00/01009 filed Mar. 17, 2000 which designated the U.S. and that International Application was published under PCT Article 21(2) in English.

The present invention relates to aqueous-based autoxidisably crosslinkable coating compositions, their preparation and use in forming films and coatings.

Autoxidisably crosslinkable polymers are polymers which crosslink on exposure to oxygen. It is known that polymers which contain unsaturated fatty acid residues undergo crosslinking by autoxidation. The unsaturation in polymers from such groups imparts latent crosslinkability so that when a coating composition thereof is dried in air (often in conjunction with a drier salt) the composition undergoes crosslinking, thereby improving its properties such as mechanical properties (improved hardness and durability) and chemical resistance. A further advantage of coatings containing unsaturated fatty acid residues is an improved glossy appearance. EP 379007, EP 0017199 and EP 647655 all describe one component emulsions which contain antoxidisable polymers having carboxylic acid functional groups to provide water dispersability.

However disadvantages of autoxidisably crosslinkable polymers containing unsaturated fatty acid residues are that the curing process is slow (typically taking a period of days) and that yellowing of the coating occurs in time.

It is known, in for example in U.S. Pat. No. 4,108,811 and WO 97/26303, to blend autoxidisably crosslinkable polymers with acrylic polymer dispersions to reduce yellowing and in some cases cost, however the performance of the resulting coatings, in particular the mechanical properties and the resistance to chemicals is greatly reduced. U.S. Pat. No. 5,559,192 discloses a composition containing an autoxidisable polymer and an acetoacetate functional vinyl polymer however the acetoacetate functional groups do not take part in any crosslinking of the composition.

We have surprisingly found that compositions of autoxidisably crosslinkable polymers containing unsaturated fatty acid residues with a polymer which is not autoxidisably crosslinkable, but has certain other crosslinking means, not only reduces the cure time and yellowing of coatings derived from such a composition, but also that the performance of such a composition in other respects (such as the mechanical properties and chemical resistance) is not vitiated and is comparable to an improvement to the performance of the autoxidisable crosslinkable polymer containing unsaturated fatty acid residues alone.

According to present invention there is provided an aqueous crosslinkable coating composition comprising as aqueous dispersed components:

i) at least one autoxidisably crosslinkable organic polymer containing unsaturated fatty acid residues, and
ii) at least one vinyl polymer which is not autoxidisably crosslinkable and bears acetoacetyl functional groups, and
wherein said composition has present therein acetoacetyl-reactive amine and/or hydrazine functional groups which impart crosslinkability to component (ii).

By an acetoacetyl functional group in this specification is meant a group having the formula:

(1)

where the methyl group may optionally be mono, di or tri-substituted (for example so as to provide therewith a higher alkyl group of 2 to 10 carbon atoms, usually 2 to 4 carbon atoms) and the methylene group may optionally be monosubstituted (usually by alkyl of 1 to 4 carbon atoms, particularly methyl). The methyl group could also, in principle, be replaced by other groups such as a cyclic phenyl group, or an optionally substituted heterocyclic group, and the use of such alternative groups are also considered to provide acetoacetyl functional groups for the purpose of this specification. A polymer-bound acetoacetyl functional group will normally be provided in the environment of an acetoacetate grouping of formula:

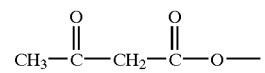

(2)

or an acetoacetamide grouping of formula:

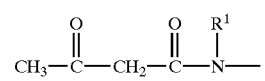

(3)

or a 1,3 diketone grouping of formula:

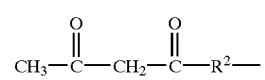

(4)

where $R^1$ is hydrogen or a monovalent hydrocarbyl radical such as an (optionally substituted) alkyl, aryl, aralkyl or alkaryl radical (usually of 1 to 10, particularly 1 to 6 carbon atoms) and $R^2$ is a divalent hydrocarbyl radical such as an (optionally substituted) alkylene, arylene, aralkylene or alkarylene radical (usually of 1 to 20, particularly 1 to 10 carbon atoms).

Suitable optional substituents for the groups represented by $R^1$ and $R^2$ and for the methyl or methylene groups of Formulae (1) to (4) may be selected from —CN, $C_{1-4}$-alkoxy, phenyl, halogen such as —F, —Cl and —Br and $C_{1-4}$-alkyl.

It is preferred, however, that the acetoacetyl functional group is provided by an acetoacetate or acetoacetamide group, and more preferably by an acetoacetate group.

By a hydrazine functional group is meant an acetoacetyl-reactive functional group of formula —NHNH$_2$ and also an acetoacetyl-reactive hydrazone group derived from such a group by reaction with a monoketone or monoaldehyde of at least two carbon atoms. It will become apparent that such functional groups are usually part of larger groups, such as those of formulae, —R—C(=O)—NH—NH$_2$, —R—C(=O)—NH—N=C<, —R—NH—C(=O)—NH—NH$_2$, —R—NH—C(=O)—NH—N=C<, and —R—NH—NH$_2$ where R is optionally substituted alkylene, optionally substituted alicyclic, or optionally substituted aryl.

By an amine functional group is meant an acetoacetyl-reactive group of formula —NH$_2$, —NH— and acetoacetyl-reactive groups derived from such groups. Examples of amine functional groups include R—NH$_2$, R—O—NH$_2$, R—O—N=C<, —R—NH—C(=O)—O—N=C< and —R—NH—C(=O)—O—NH$_2$ where R is as described above.

By an autoxidisably crosslinkable polymer is meant a polymer which crosslinks on exposure to oxygen from air by virtue of containing unsaturated fatty acid residues.

By a not autoxidisably crosslinkable polymer is meant a polymer not containing unsaturated fatty acid residues.

For the purposes of this invention an "aqueous dispersion" of a polymer(s) means a dispersion of a polymer(s) in a liquid carrier medium of which water is the principle component (at least 50 weight %, more usually at least 80 weight %, or the carrier medium). Minor amounts of organic liquids may optionally be present. The dispersion will typically comprise colloidally dispersed particles of the polymer (s), i.e. will typically be in the form of an aqueous latex (ices).

Preferably the autoxidisably crosslinkable organic polymer containing unsaturated fatty acid residues is a polyurethane polymer. Other suitable polymers include alkyds which may be self-emulsifiable, water-based or emulsified alkyds.

In the invention composition, the acetoacetyl-reactive amine and/or hydrazine functional groups impart crosslinkability to the vinyl polymer(s) of component (ii) by virtue of the latter bearing acetoacetyl functional groups. It is nevertheless within the scope of the invention, albeit less preferred, for such amine and/or hydrazine functional groups to also impart crosslinkability to the polymer(s) of component (i) if this polymer(s) also bears acetoacetyl-functional groups—as is possible, but less preferred.

The disposition of the amine and/or hydrazine functional groups in the invention composition to impart crosslinkability as defined may be realised in various ways. More preferably amine functional groups are used in the invention composition.

In a preferred embodiment, the acetoacetyl-reactive amine and/or hydrazine functional groups are present in the composition by virtue of being provided by added discrete compounds bearing 2 or more amine groups, hereinafter called polyamines, or 2 or more hydrazine functional groups, hereinafter called polyhydrazines. By "discrete" is meant that such compounds are exclusive of the polymers of components (i) and (ii). Preferably the polyamines or polyhydrazines are diamines or triamines (i.e. having 2 or 3 amine groups) or dihydrazines (i.e. having 2 hydrazine functional groups).

The presence of such a polyamine or polyhydrazine will impart crosslinkability to the vinyl polymer(s) of component (ii). However, if the polymer(s) of component (i) also bears acetoacetyl functional groups (as is possible as discussed above), such a polyamine or polyhydrazine will also impart crosslinkability to this polymer(s) of component (i) by reaction with the acetoacetyl functional groups thereof, i.e. in addition to crosslinkability by autoxidation.

It is, furthermore, also possible for amine and/or hydrazine functional groups to be borne on the polymer(s) of component (i), i.e. the autoxidisably crosslinkable organic polymer containing unsaturated fatty acid residues could also bear acetoacetyl-reactive amine or hydrazine groups, thereby allowing the organic polymer(s) to undergo crosslinking by reaction with the acetoacetyl functional groups of the vinyl polymer(s) as well as crosslinking by autoxidation.

As discussed above, the polymer of component (i) in this embodiment may itself also bear acetoacetyl functional groups, and in such a case crosslinkability could also be provided by reaction between the polymer-based amine or hydrazine groups of the polymer(s) of component (i) and the polymer-based acetoacetyl functional groups of the polymer (s) of component (i) (in addition to that by reaction with the polymer-based acetoacetyl functional groups of the vinyl polymer(s) of component (ii)).

In yet a further embodiment, the not autoxidisably crosslinkable vinyl polymer(s) of component (ii) may in addition to bearing acetoacetyl functional groups also bear acetoacetyl-reactive amine or hydrazine groups. In such a case, crosslinkability could be provided by reaction between these polymer-based acetoacetyl functional groups and polymer-based amine or hydrazine groups of the vinyl polymer(s) of component (ii) (if present).

It is apparent from the foregoing, that more than one of such embodiments could be operative in the same invention composition. However, in the most preferred embodiment, the amine and/or hydrazine groups are present only in discrete added polyamines and/or polyhydrazines and the acetoacetyl functional groups are present only in the vinyl polymer(s) of component (ii). Alternatively a mixture of discrete added and polymer based amine and/or hydrazine groups may be employed.

Autoxidisably crosslinkable polyurethane polymers containing unsaturated fatty acid residues are preferably obtained from the reaction of at least one organic polyisocyanate with at least one isocyanate reactive organic compound bearing unsaturated fatty acid residue(s), optionally (but preferably) with isocyanate-reactive organic compounds bearing water-dispersing groups, and in some embodiments (as implied above), isocyanate-reactive compounds bearing carbonyl and/or carbonyl-reactive amine or hydrazine groups. Optionally, the reactants may also include a low molecular weight isocyanate-reactive compound(s) (preferably with a molecular weight below 500), usually an organic polyol and/or a high molecular isocyante-reactive compound(s) (preferably with a molecular weight of from 500 to 6000), also usually an organic polyol—such compounds, if used, bearing neither unsaturated fatty acid residues nor water-dispersing groups. Isocyanate-reactive groups include —OH, —NH—, and —NH$_2$.

The polyurethane polymer may be prepared in a conventional manner by reacting the organic polyisocyanate(s) with a stoichiometric equivalent amount of isocyanate-reactive compounds.

The polyurethane polymer may be prepared in a conventional manner by reacting the organic polyisocyanate(s) with the isocyanate-reactive compound(s) by methods well known in the prior art. Preferably an isocyanate-terminated polyurethane prepolymer is first formed, which is chain extended with an active hydrogen containing compound. If the polymer is made in such manner, the unsaturated fatty acid residue bearing compound is introduced into the polyurethane backbone during the prepolymer formation and/or during the chain extension step. The optional polymer-based carbonyl, amine or hydrazine groups (see supra) may also be introduced during the prepolymer formation and/or during the chain extension step.

Alternatively a polyurethane (preferably of a low molecular weight) may be made by capping an isocyanate-terminated polyurethane with monofunctional isocyanate-reactive compounds or by using an excess of compounds having isocyanate-reactive groups during polymer preparation, or a combination of the above preparations may be used.

Optionally (but preferably) monomer(s) bearing non-ionic or ionic water-dispersing or emulsifier groups (or groups that may be subsequently converted thereto) are included in the prepolymer formation to provide the facility of self-dispersability in water of the polyurethane prepolymer and the final autoxidisably crosslinkable polyurethane polymer.

Preferred isocyanate-reactive compounds bearing unsaturated fatty acid residue(s) which may be used in the urethane synthesis may be obtained from the reaction, using techniques known in the art of a suitable fatty acid with a hydroxyl donor (preferably an alcohol or polyol) or amine donor to provide a fatty acid residue-bearing compound with at least one (preferably at least two) hydroxyl or amine isocyanate-reactive groups.

Preferred fatty acids include fatty acids derived from castor oil, soybean oil, sunflower oil, tallow oil, linseed oil and fatty acids such as linoleic acid, palmitoleic acid, linolenic acid, oleic acid, oleosteric acid, licanic acid, arachidonic acid, ricinoleic acid and/or mixtures thereof.

Suitable polyisocyanates include aliphatic, cycloaliphatic, araliphatic and/or aromatic polyisocyanates. Examples of suitable polyisocyanates include ethylene diisocyanate, 1–6-hexamethylene diisocyanate, isophorone diisocyanate, cyclohexane-1,4-diisocyanate, 4,4'-dicyclohexylmethane diisocyanate, p-xylylene diisocyanate, tetramethylxylene diisocyanate, 1,4-phenylene diisocyanate, 2–4-toluene diisocyanate, 2,6-toluene diisocyanate, 4,4'-diphenylmethane diisocyanate, 1,5-naphthylene diisocyanate, 2,4'-diphenylmethane diisocyanate, 3(4)-isocyanatomethyl-1-methyl cyclohexyl isocyanate (IMCI) and polymethylene polyphenyl polyisocyanates. Mixtures of polyisocyanates can be used and also polyisocyanates which have been modified by the introduction of urethane, allophanate, urea, biuret, carbodiimide, uretonimine, urethdion or isocyanurate residues.

Other isocyanate-reactive organic compounds bearing neither unsaturated fatty acid residues nor water-dispersing groups (see supra) which may be used in the preparation of polyurethanes or polyurethane prepolymers preferably containing at least one (preferably at least two) isocyanate-reactive groups, and are more preferably organic polyols. The organic polyols particularly include diols and triols and mixtures thereof but higher functionality polyols may be used, for examples as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred polyol molecular weights are from 250 to 6000, more preferably from 500 to 3000. Low molecular weight organic compounds containing at least one (preferably at least two) isocyanate-reactive groups and having a weight average molecular weight of up to 500, preferably in the range of 40 to 250 can also be used. Examples include ethyleneglycol, 1-propanol and 1,4-cyclohexyldimethanol.

The water-dispersing group content of the polyurethane (if present) may vary within wide limits but should be sufficient to provide the polyurethane with the required degree of water-dispersibility.

Water-dispersing groups are optionally incorporated into the polyurethane by including an isocyanate-reactive and/or isocyanate compound(s) bearing nonionic and/or ionic water-dispersing groups (or groups which may be subsequently converted to such water-dispersing groups) as reactants in the preparation of the polymer or prepolymer.

Typically, ionic water-dispersing groups are anionic salt groups, for example carboxylate, sulphonate and phosphonate salt groups. Examples of such compounds include carboxy group containing diols and triols, for example dihydroxy alkanoic acids. The preferred carboxy containing diol is 2,2-dimethylolpropionic acid or 2,2-dimethylolbutanoic acid. If desired, the carboxy containing diol or triol may be incorporated into a polyester by reaction with a dicarboxylic acid before being incorporated into the prepolymer. The conversion of any acid groups present in the prepolymer to anionic salt groups may be effected by neutralising the said acidic groups before, after or simultaneously with formation of an aqueous dispersion of the prepolymer.

Non-ionic water-dispersing groups are preferably pendant polyoxyalkylene groups, particularly polyoxyethylene groups.

The polyurethane polymer or prepolymer may have a combination of ionic dispersing groups and non-ionic water-dispersing groups.

Optionally a carbonyl functional group (such as a ketone or aldehyde group) may be introduced onto a polyurethane backbone by using for example carbonyl functional compounds with at least one and preferably two iscocyanate-reactive groups, for example dihydroxyketones.

Optionally an amine or hydrazine functional group may similarly be introduced onto a polyurethane backbone. For example a compound is used in which the hydrazine functionality has been blocked by reaction with a monoaldehyde or a monoketone to form a hydrazone structure. This expedient is employed because a hydrazine functionality will otherwise react during the prepolymer preparation and so be partially or even completely removed.

Examples of suitable isocyanate-reactive monoaldehyde or monoketone hydrazine compounds include gammahydroxy butyric hydrazide and semi carbazide ethyl methacrylate blocked with a monoaldehyde or monoketone.

Active hydrogen-containing chain extending compounds which provide hydrazine (or hydrazone) functionality pendant to the polyurethane chain include diamino hydrazides. Such compounds may be prepared by reacting a diamine with an acrylic acid derivative (for example ethyl acrylate) and then reacting the product obtained with hydrazine.

When an isocyanate-terminated polyurethane prepolymer is prepared, it is conventionally formed by reacting a stoichiometric excess of the organic polyisocyanate with the isocyanate-reactive compounds as hereinbefore described under substantially anhydrous conditions at a temperature between about 30° C. and about 130° C. until reaction between the isocyanate groups and the isocyanate-reactive groups is substantially complete; the reactants for the prepolymer are generally used in proportions corresponding to a ratio of isocyanate groups to isocyanate-reactive groups of from about 1.1:1 to about 6:1, preferably from about 1.5:1 to 3:1.

If desired, catalysts such as dibutyltin dilaurate and stannous octoate, zirconium or titanium based catalysts may be used to assist prepolymer formation. An organic solvent may optionally be added before or after prepolymer formation to control the viscosity. Examples of solvents include water-miscible solvents such as N-methylpyrrolidone, dimethyl sulphoxide and dialkyl ethers of glycol acetates or mixtures of N-methylpyrrolidone and methyl ethyl ketone. Optionally no organic solvents are added.

An aqueous polyurethane dispersion may then be prepared by dispersing the isocyanate-terminated polyurethane prepolymer (optionally carried in an organic solvent medium) in an aqueous medium (using surfactants, or more preferably by utilising the self-dispersability of the prepolymer if dispersing groups are present therein, although surfactants may still be employed if desired) and chain extending the prepolymer with active hydrogen-containing chain extender in the aqueous phase.

The aqueous polyurethane dispersion may of course comprise more than one polyurethane polymer prepared as defined above.

The urethane prepolymer may be dispersed in water using techniques well known in the art. Preferably, the prepolymer is added to the water with agitation or, alternatively, water may be stirred into the prepolymer.

Active hydrogen-containing chain extenders which may be reacted with the prepolymer include polyol(s), amino-alcohol(s), a primary or secondary diamine(s) or polyamine(s), hydrazine(s) or a substituted hydrazine(s).

Examples of such chain extenders useful herein include alkylene diamines such as ethylene diamine and cyclic amines such as isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazine such as gammahydroxylbutyric hydrazide, bis-semi-carbazide, and bis-hydrazide carbonic esters of glycols may be useful. Water itself may be effective as an indirect chain extender.

Where the chain extender is other than water, for example a polyol, polyamine or hydrazine, it may be added to the aqueous dispersion of prepolymer or, alternatively, it may already be present in the aqueous medium when the prepolymer is dispersed therein. The prepolymer may also be chain extended to form the polyurethane polymer while dissolved in organic solvent (usually acetone) followed by the addition of water to the polymer solution until water becomes the continuous phase and the subsequent removal of the solvent by distillation to form an aqueous dispersion.

The chain extension can be conducted at elevated, reduced or ambient temperatures. Convenient temperatures are from about 5° C. to 95° C. or, more preferably, from about 10° C. to 60° C.

The total amount of chain extender materials employed (apart from water) should be such that the ratio of active hydrogens in the chain extender(s) to isocyanate groups in the prepolymer preferably being in the range from 0.1:1 to 2.0:1 more preferably 0.80:1 to 1.7:1.

The not autoxidisably crosslinkable vinyl polymers bearing acetoacetyl functional groups of component (ii) may be formed by the free-radical addition polymerisation of at least one acetoacetyl functional group containing monoethylenically unsaturated monomer with at least one other olefinically unsaturated monomer not providing acetoacetyl functionality.

Suitable olefinically unsaturated monomers which bear acetoacetyl functional groups include acetoacetic acid esters and amides of hydroxyalkylacrylates, hydroxyalkyl-methacrylates and hydroxy alkenes. The alkyl group in any of the hydroxyalkyl-acrylates or -methacrylates is preferably a $C_{1-10}$-alkyl group each of which may be a straight or branched chain. The alkene group in the hydroxyalkene is preferably a $C_{2-10}$-alkene, more preferably a $C_{2-6}$-alkene and especially a $C_3$-alkene group.

Preferred olefinically unsaturated monomers bearing acetoacetyl functional groups include acetoacetic acid esters and amides of hydroxyethylacrylate, hydroxypropylacrylate, hydroxyethylmethacrylate, hydroxypropylmethacrylate and ally alcohol.

Especially preferred acetoacetyl functional group containing unsaturated monomers include acetoacetoxyethyl methacrylate (AAEM), acetoacetoxyethyl acrylate, acetoacetoxypropyl methacrylate, allyacetoacetate, acetoacetoxybutyl methacrylate, 2,3-di(acetoacetoxy)propyl methacrylate and 2-acetoamido-2-methylpropyl methacrylate.

Acetoacetyl functional group containing unsaturated monomers can be prepared by reacting unsaturated hydroxy functional monomers with diketones or other acetoacetylating agents.

The proportion of acetoacetyl functional groups in the vinyl polymer is preferably 2 to 200 milliequivalents per 100 g of polymer, more preferably 5 to 100 milliequievalents per 100 g of polymer.

Examples of non-acetoacetyl-providing olefinically unsaturated monomers include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), heterocyclic vinyl compounds, alkyl esters of monolefinically unsaturated dicarboxylic acids (such as di-n-butyl maleate and di-n-butyl fumarate) and, in particular, esters, of acrylic acid and methacrylic acid, examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, hydroxyethylmethacrylate, hydroxypropylmethacrylate, isopropyl methacrylate, n-propyl acrylate and n-propyl methacrylate.

Examples of monoaldehyde or monoketone-containing unsaturated monomers include acrolein, methacrolein, diacetone-acrylamide, crotonaldehyde, 4-vinylbenzaldehyde, vinyl alkyl ketones of 4 to 7 carbon atoms such as vinyl methyl ketone, and acryloxy- and methacryloxy-alkyl propanols. Further examples include acrylamidopivalaldehyde, methacrylamidopivalaldehyde, 3-acrylamidomethyl-anisaldehyde, diacetone acrylate and diacetone methacrylate.

Olefinically unsaturated monomers bearing anionic water-dispersing groups may also be used, examples of which include acrylic acid, methacrylic acid, itaconic acid and/or maleic acid.

Olefinically unsaturated monomers having non-ionic water-dispersing groups such as alkoxy polyethylene glycol methacrylates may also be used.

The not autoxidisably crosslinkable vinyl polymer may bear in addition to the acetoacetyl functional group, amine and/or hydrazine functional groups. Hydrazine functional groups may preferably be introduced by polymerising into the vinyl polymer at least one olefinically unsaturated monomer with (chain-pendant) hydrazinolysable groups which are subsequently reacted with a hydrazine yielding agent to convert at least a proportion of the hydrazinolysable groups into hydrazine functional groups. Preferred methacrylic acid esters are methyl, ethyl, propyl, isopropyl, n-butyl, tertiary and secondary butyl esters, most preferred are methyl and ethyl esters.

Examples of monomers providing chain-pendant hydrazinolysable groups include α-chloracrylic acid and especially acid chlorides or esters of acrylic acid, and acid chlorides or esters of methacrylic acid.

The hydrazine content (if present) of the vinyl polymer is typically up to 300 milliequivalents per 100 g polymer, preferably 10 to 200 milliequivalents per 100 g polymer.

Hydrazinolysis may be effected by dissolving or dispersing the vinyl polymer in a water-miscible alcohol or a water-alcohol mixture followed by the addition of hydrazine or hydrazine hydrate.

A vinyl polymer bearing acetoacetyl functional groups may be prepared by any suitable free-radical initiated polymerisation technique, a free-radical initiator and appropriate heating (e.g. 40° C. to 90° C.) being employed. The polymerisation is normally effected in an aqueous medium, and in particular aqueous emulsion polymerisation is used to prepare the polymer with optionally conventional dispersants being used. Free radical initiators include hydrogen peroxide, t-butylhydroperoxide, persulphates such as $NH_4$ persulphate K persulphate and Na persulphate or a redox system may be used.

Not autoxidisably crosslinkable vinyl polymers bearing acetoacetyl functional groups for use in the invention preferably have a weight average molecular weight within the range 1000 to 5,000,000 (more usually 2,000 to 1,000,000). The weight average molecular weight may be measured by gel permeation chromatography (gpc).

Preferably polyhydrazines or polyamines used to crosslink acetoacetyl or optional carbonyl functional groups present in the composition are, incorporated into components (i) and/or (ii) before mixing the components or after or during the mixing of components (i) and (ii), as discrete entities.

Preferred polyhydrazines include but are not limited to dicarboxylic acid bis-hydrazides, bis-hydrazones, specific examples being oxalic acid dihydrazide, malonic acid dihydrazide, succinic acid dihydrazide, adipic acid dihydrazide, and sebacic acid dihydrazide, cyclohexane dicarboxylic acid bis-hydrazides, azelaic acid bis-hydrazides; also carbonic acid hydrazides, bis-semicarbazides, trihydrazides, dihydrazinoalkones and dihydrazines of aromatic hydrocarbons, for example 1,4-dihydrazinobenzene and 2,3-dihydrazinonophthalene, dihydrazine and others known in the art. Preferred examples include adipic acid dihydrazide and carbonic acid dihydrazides.

Preferred polyamines include but are not limited to those with primary and/or secondary amino groups having from 2 to 10 such amino groups per molecule especially preferred are primary amines. Suitable examples include ethylenediamine, propylenediamine, decamethylene diamine, 1,2-diaminocyclohexane, isophoronediamine, 4-amino-1,8-octanediamine urea, N-(2-hydroxyethyl) ethylenediamine, tris(2-aminoethyl)amine, melamine, diethylenetriamine, dipropylenetriamine, dibutylenetriamine, polyethylene imines, and Jeffamine, (polyoxyethylene amines available from Huntsman Corporation, Houston, Tex.)

If discrete polyamines or polyhydrazines are added to the composition, the level is preferably that to provide a range of 0.02 to 1.6 moles more preferably 0.05 to 0.9 moles of amine or hydrazine groups present per mole of acetoacetyl functional groups present in the composition.

Component (ii), in addition to the at least one not autoxidisably crosslinkable vinyl polymer bearing acetoacetyl groups may optionally comprise a further not autoxidisably crosslinkable polymer or polymer moiety. Suitable not autoxidisably crosslinkable polymers include vinyl polymers not bearing acetoacetyl functional groups, polyurethane polymers not bearing acetoacetyl functional groups and/or polyurethane polymers bearing acetoacetyl functional groups.

Preferably the additional not autoxidisably crosslinkable polymer is a polyurethane polymer or polyurethane polymer moiety.

If a not autoxidisably crosslinkable polyurethane polymer is included in the composition as part of component (ii) (see later) it may be made in the same manner as the autoxidisably crosslinkable polyurethane as described above but without the introduction of unsaturated fatty acid residue bearing compounds.

The additional not autoxidisably crosslinkable polymer or polymer moiety is a) optionally a discrete polymer (i.e. not covalently bonded to the not autoxidisably crosslinkable vinyl polymer bearing acetoacetyl functional groups), b) formed by in-situ polymerisation in the presence of the at least one non-autoxidisably crosslinkable vinyl polymer bearing acetoacetyl functional groups. Alternatively the not autoxidisably crosslinkable vinyl polymer bearing acetoacetyl functional groups is formed by in-situ polymerisation in the presence of the additional polymer.

Alternatively the additional polymer may be grafted to the not autoxidisably crosslinkable vinyl polymer bearing acetoacetyl functional groups or may comprise a copolymerised moiety of the not autoxidisably crosslinkable vinyl polymer bearing acetoacetyl functional groups.

The autoxidisably crosslinkable polymer of component (i) and the not autoxidisably crosslinkable polymer(s) of component (ii) of the composition of the invention may be brought together by any suitable technique.

For example an aqueous dispersion of component (i) and an aqueous dispersion of component (ii) may be mixed together with agitation. The aqueous solution may also contain water-miscible organic solvents.

Alternatively the not autoxidisably crosslinkable vinyl polymer may be prepared in the presence of the autoxidisably crosslinkable polymer (component (i)). For example free-radical initiators may be added to a dispersed mixture of component (i) and vinyl monomer(s) or vice versa and polymerisation of the vinyl polymer effected. Optionally the not autoxidisably crosslinkable vinyl polymer may be grafted to the autoxidisably crosslinkable polymer.

The weight ratio of organic polymer(s) of component (i) to the not autoxidisably crosslinkable vinyl polymer bearing acetoacetyl functional groups in the composition is suitably in the range from 90:10 to 10:90 more preferably of from 70:30 to 30:70

Preferred pH ranges are 4 to 11, more preferably 6.5 to 9.5 and especially 7 to 8.5.

Neutralisation agents which may be applied include organic bases, for example hydroxides of lithium, sodium or potassium, and organic bases for example ammonia or tertiary amines for example dimethyl ethanol amine and triethylamine morpholine.

It is preferred to store the invention composition in a closed container, where due to the low amount of oxygen no significant crosslinking of the autoxidisable polymer has been found to occur until after application. However, this is by no means always necessary and indeed it is possible to use the invention composition soon after its production.

After coating the composition the water evaporates, oxygen in the atmosphere initiates autoxidisation and a dual crosslinking reaction takes place.

The aqueous composition of the invention may be advantageously employed as coating compositions, (e.g. protective or adhesive coating compositions) for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam and the like, by any conventional method including brushing, dipping, flow coating, spraying, and the like.

Drier salts preferably comprise part of the composition. Examples include polyvalent salts containing cobalt, calcium, copper, zinc, iron, zirconium and manganese as the cation and halides, nitrates, sulphates, acetates, napthenates or acetoacetonates as the anion. The amount of drier used is in the range from 0 to 1% metal content by weight of the composition. The compositions may contain other conventional ingredients including organic solvents, pigments, dyes, emulsifiers, surfactants, thickeners, heat stabilisers, levelling agents, anti-cratering agents, fillers, sedimentation inhibitors, UV absorbers, antioxidants, waxes and the like introduced at any stage of the production process or subsequently. It is possible to include an amount of an antimony oxide in the dispersions to enhance the fire retardant properties. The dispersions may also be used as adhesives for materials such as polypropylene, polyester, polyurethane, leather and the like or as binding agents for various particulate materials.

The dispersions suitably have a solids contents of from about 20 to 60% by weight, preferably from about 25 to 45% by weight.

If desired, the compositions of the present invention may include other polymer dispersions for example polyurethane, polyamide, polyepoxide, polyvinyl acetate, polyethylene, polystyrene, polybutadiene, polyvinyl chloride, polyacrylate and other homopolymer and copolymer dispersions. These can sometimes be prepared in-situ (for example by polymerisation of the monomers in the presence of the polyurethane polymer or prepolymer).

The weight ratio of the organic polymer of component (i) and the not autoxidisably crosslinkable vinyl polymer(s) bearing acetoacetyl functional groups to other polymers included in the composition is preferably from 100:00 to 40:60, more preferably 100:00 to 70:30, most preferably 100:0.

There is still further provided according to the invention a coated substrate having a coating obtainable or derived from an aqueous crosslinkable coating composition comprising a polymer dispersion as defined above, and the use of such a composition for coating a substrate.

The present invention is now illustrated by the following examples. Unless otherwise specified, all parts and percentages are on a weight basis.

PREPARATION OF AUTOXIDISABLY CROSSLINKABLE ORGANIC DOLYMERS CONTAINING UNSATURATED FATTY ACID RESIDUES=FATTY ACIDS 1–5

Fatty Acid 1

An Unsaturated Fatty Acid Residue Containing Urethane Dispersion

Stage 1—Synthesis of a Fatty Acid Residue Containing Polyester Polyol for Incorporation Into a Polyurethane

| Components | Ingredients | parts by weight |
|---|---|---|
| 1 | Adipic acid | 535.9 |
| 2 | "Prifac" 8960 (a polyunsaturated fatty acid from Unichema) | 916.0 |
| 3 | 1,4-Cyclohexane dimethanol | 250.5 |
| 4 | Trimethylolpropane | 411.7 |
| 5 | Fascat 2005 (SnCl$_2$) | 0.1 |

-continued

| Components | Ingredients | parts by weight |
|---|---|---|
| 6 | Cardura E10 (Neodecanoic acid glycidyl ester) | 97.7 |
| 7 | N,N-dimethylbenzylamine | 1.9 |

Components 1, 2, 3 and 4 were charged to a 2.5 litre flask fitted with a stirrer, condenser, nitrogen inlet and thermocouple. The resultant mixture was gradually heated to the reaction temperature of 215° C. Water of distillation was collected. At this reaction temperature component 5 was added and the mixture was esterified until an acid value of 10.4 mg KOH/g was obtained. Subsequently the temperature was reduced to 170° C. and components 6 and 7 were added and reacted until an acid value of 0.1 mg KOH/g was obtained. The total reaction time was 12 hours. The hydroxyl value of the polyester polyol was 76.8 mg KOH/g.

Stage 2—Synthesis of a Fatty Acid Residue Containing Polyurethane Prepolymer

An isocyanate terminated urethane prepolymer containing the polyester polyol prepared in Stage 1 was prepared as described below:

269.6 g of Desmodur W (4,4'-dicyclohexylmethane diisocyanate), 34.0 g of a difunctional isocyanate-reactive non-ionic component with a joint hydroxy number and acid number of 87 and a polypropylene oxide/ethylene (PO/EO) ratio of 9/1, 34.0 g dimethylol propionic acid (DMPA), 342.4 g of the polyester polyol from stage 1 and 120.0 g of N-metylpyrrolidone (NMP) were added to a 1 litre 3 necked round bottom flask. The mixture was stirred under nitrogen. The mixture was heated to 55 C and 4 drops of Dabco T-9 (a tin octoate catalyst from Air Products) were added. The mixture was then heated to 95° C. and kept at this temperature for 1 hour. 4 drops of Dabco T-9 were added and the mixture was kept at 95° C. for another hour. 8.7 g sample was taken for NCO determination. The residual NCO content was 5.05%. The batch was cooled down to 75° C.

25.6 g of triethylamine (TEA) and 10.2 g of Dapro 5005 (manganese drier salt) were added to the prepolymer. The mixture was kept at this temperature for 40 minutes.

Stage 3—Preparation of a Polyurethane Dispersion From the Polyurethane Prepolymer Prepared in Stage 2.

600.0 g of the prepolymer prepared in Stage 2 was added to a waterphase consisting of 820.7 g demineralised water and 19.6 g of Atlas G-4809 a non-ionic alkoxylated alkylphenol surfactant (70%). The total addition time was 65 minutes. The prepolymer was kept at 70–75° C. during the addition to the waterphase, the temperature of the waterphase was 30–32° C.

When the addition was complete, a mixture of 15.6 g of hydrazine hydrate (63.7%) and 25 g of demineralised water was added to the dispersion. The temperature of the dispersion increased to 40° C. and was kept at this temperature for 30 minutes. The batch was cooled to room temperature and sieved through a 200 mesh sieving cloth.

The dispersion had a solids content of 35%, pH of 8.1, viscosity of 210 mPas at 25° C. and a sediment content of <0.05%.

Fatty Acid 2

A Fatty Acid Residue Containing Low Molecular Weight (non Chain Extended) Polyurethane Stage 1—Preparation of Amide Ester Diol Products From Soybean Oil.

A reactor was charged with 148.8 g diethanolamine and 1.2 g sodium methoxide and the mixture was heated to 90–100° C. until all of the sodium methoxide had dissolved.

Subsequently, 750 g soyabean oil (available from Alnor Oil company) was added to the mixture followed by stirring and heating to 105–110° C. for 4.5 hours.

Gel Permeation Chromatography (GPC) of the amide ester diol product showed its composition to consist of 10.7% unreacted soyabean oil, 41.5% diglyceride mono-ol and 47.8% monoglyceride amide diol (ester amide polyol). The theoretical hydroxy equivalent weight of the amide ester diol product was 211 and corresponding OH number was 266 mg KOH/g.

Stage 2—Preparation of a Uralkyd Resin 116.3 g of the amide ester diol product from Stage 1 was mixed in a reactor with 18 g 2,2-dimethylolpropionic acid, 12.8 g cyclohexanedimethanol, 20.3 g methoxypolyethyleneoxide glycol (MPEG750), 134.2 g N-methylpyrrolidone, and 118.3 g toluene diisocyanate. The temperature was maintained at 50–60° C. for one hour. Then more amide ester diol product (133.7 g) was added and the temperature increased to 70–80° C. for two hours.

Stage 3—Preparation of an Aqueous Uralkyd Resin Dispersion

The product from Stage 2 was diluted with 76.7 g dipropylene glycol monomethyl ether (acting as a cosolvent to reduce viscosity) and 9.55 g dimethylethanolamine dissolved in 187 g water (base for neutralising carboxyl groups). 5.6 g Drier salt (Dapro 5005 available from Daniels Products) followed by 520 g water at 60° C. was added to the mixture while stirring.

The resulting dispersion had a clear, transparent yellow colour with a viscosity of 1640 mPa.s at 25° C., a pH of 7.1 and solids content of 31%.

Fatty Acid 3

An Autoxidisably Crosslinkable Polyester Containing Unsaturated Fatty Acid Residues Worléesol 31A (available from Worlée-Chemie GmbH) is an anionically stabilised alkyd resin containing unsaturated fatty acid residues, neutralised with ammonia and is supplied as a solution in a water/butylglycol mixture (80/20). The resin has a solid content of 45.9%, a viscosity at 20° C. of 127 s (according to DIN 53211), the acid number on solids is 100.3 mg KOH/g and pH is 7.8. This solution was used as supplied.

Fatty Acid 4

An Autoxidisably Crosslinkable Urethane Dispersion Containing Unsaturated Fatty Acid Residues NeoRez R2001 (available from NeoResins, Avecia BV) is a chain extended urethane dispersion containing unsaturated fatty acid residues. The fatty acid content is approximately 35% on solids. The dispersion has a solids content of 34.9%, pH was 7.8 and the viscosity was 220 mPa.s. This dispersion was used as supplied. (NeoRez and NeoResins are Trade Marks of Avecia bv).

Fatty Acid 5

An Autoxidisably Crosslinkable Urethane-acrylic Hybrid Containing Unsaturated Fatty Acid Residues XR9405 (available from Avecia Inc) is a urethane-acrylic hybrid dispersion containing unsaturated fatty acid residues. The fatty acid content is approximately 40% on solids. The dispersion has a solids content of 30%, pH was 7.6 and the viscosity was 212 mPa.s. This dispersion was used as supplied.

SYNTHESIS OF NOT AUTOXIDISABLY CROSSLINKABLE VINYL DISPERSIONS BEARING ACETOACETYL FUNCTIONAL GROUPS=NAVP's 6 to 9

Navp 6

A not Autoxidsably Crosslinkable Acrylic Dispersion Bearing Acetoacetyl Functional Groups 912 g of demineralised water and 1.82 g of sodium lauryl sulphate (30% w/w) were added to a three necked round bottom flask, equipped with a thermometer, stirrer, cooler and a $N_2$ inlet. The mixture was heated to 70° C. under $N_2$ atmosphere.

5% of a monomer mixture consisting of 188.2 g of demineralised water, 5.45 g of sodium lauryl sulphate (30% w/w), 7.0 g of lauryl mercaptane, 3.5 g of mercapto propionic acid, 34.9 g of acetoacetoxyethyl methacrylate (AAEM), 43.6 g of methacrylic acid and 357.6 g of methylmethacrylate was added to the reactor. The reactor content was then heated to 80° C.

30% of a solution of ammonium persulphate (87.2 g, 1.5% w/w) in water was added to the reactor. The reactor content was heated to 85° C. and mixed at this temperature for 5 minutes.

The remainder of the monomer mixture was added to the reactor after 60 minutes, and the remainder of the ammonium persulphate solution was added to the reactor after 70 minutes. The reactor content was kept at 85° C. during this period. After the addition was complete, the reactor content was held at 85° C. for another 30 minutes.

A solution of 34.5 g of ammonia (25% w/w) and 124.4 g of demineralised water was added to the reactor. The reactor content was held at 85° C. for another 20 minutes. After this the batch was cooled down to room temperature and sieved through a 200 mesh sieve cloth. The pH was 7.8 and the viscosity was 4 mPas at 25° C.

1034.5 g of this polymer dispersion was mixed with 195.4 g of demineralised water for 15 minutes at room temperature. 0.22 g of dimethylethanol amine and 160.8 g of butylmethacrylate and 45.2 g of butylacrylate, and 6.4 g of AAEM were added to the reactor, followed by 1.84 g of tert.-butylhydroperoxide (30% solution in water w/w) and 2.8 g of a 1% (w/w) solution of iron ethylene diamine tetraacetate (FeEDTA) in water. The reactor content was heated to 35° C. and mixed for 60 minutes.

2.7 g of a 3.96% (w/w) solution of i-ascorbic acid in water was added and the temperature of the reactor content increased to 53° C. The batch was held at this temperature for 15 minutes.

Then 40.0 g of a 1.21% (w/w) solution of i-ascorbic acid in water was added to the reactor in 30 minutes at 53° C. The batch was mixed for 15 minutes and cooled down to 35° C.

A mixture of dimethylethanol amine (0.22 g), butyl methacrylate (160.8 g) AAEM (6.38 g) and butyl acrylate (45.2 g) was added to the reactor. 1.84 g of tert.-butylhydroperoxide (30% solution in water w/w), 2.86 g of a 1% (w/w) solution of FeEDTA in water and 235.8 g of demineralised water were added to the reactor and mixed for 60 minutes at 35° C. 2.7 g of a 3.96% (w/w) solution of i-ascorbic acid in water was added to the reactor content.

The temperature of the batch increased to 48° C. and was mixed at this temperature for 15 minutes.

Then 37.0 g of a 1.21% (w/w) solution of i-ascorbic acid in water was added to the reactor in 30 minutes at 47° C.

The batch was mixed for 30 minutes at 47° C., and a solution of crosslinker and demineralised water was added before mixing for a further 30 minutes at 47° C., cooled down to room temperature and sieved through a 200 mesh sieve cloth.

The specifications of this batch were as follows: solids content 34.7%, pH of 8.1 and viscosity of 86 mPas at 25° C. To 100 g of this dispersion was added 7.2 g of Jeffamine T-403 ( a polyoxyethylene amine available from Huntsman Corporation, Houston, Tex.) and 6.7 g of dimineralised water. The pH of the dispersion was 8.7 and the viscosity 77 mPas at 25° C.

Navp 7

A not Autoxidisably Crosslinkable Acrylic Dispersion Bearing Acetoacetyl Functional Groups 859.8 g of demineralised water, 14.0 g of sodium lauryl sulphate (30w/w), 1.69 g ammonium persulphate and 1.03 g of ammonium bicarbonate (25% w/w) were added to a three necked round bottom flask, equipped with a thermometer, stirrer, cooler and a $N_2$ inlet. 10% of a monomer mixture consisting of 242.0 g of demineralised water, 28.1 g of sodium lauryl sulphate (30% w/w), 2.53 g ammonium persulphate, 2 g ammonium bicarbonate (25% w/w), 50.5 g acetoacetoxy ethyl methacrylate, 33.7 g methacrylic acid, 421.2 g butylmethacrylate, 142.6 g butylacrylate and 194.3 g styrene was added to the reactor. This mixture was heated to 80° C. under $N_2$ atmosphere and mixed at this temperature for 20 minutes. The remainder of the monomer mixture was added to the reactor over a period of 90 minutes. The reactor content was kept at 80° C. during this period. After the addition was complete, the reactor content was held at 80° C. for another 30 minutes. A solution of 3.08 g of ammonia (25% w/w) and 3.34 g of demineralised water was added to the reactor. The reactor content was held at 80° C. for another 30 minutes. After this the batch was cooled down to room temperature and sieved through a 200 mesh sieve cloth. The pH was 6.3 and the viscosity was 43 mPa.s at 25° C. To 1000 g of this dispersion 4.8 g of 4-(aminomethyl)-1,8-octane diamine (available from BASF) was added as crosslinker.

Navp 8

A not Autoxidisably Crosslinkable Acrvlic Dispersion Bearing Acetoacetvl Functional Groups 859.8 g of demineralised water, 14.0 g of sodium lauryl sulphate (30w/w), 1.69 g ammonium persulphate and 1.03 g of ammonium bicarbonate (25% w/w) were added to a three necked round bottom flask, equipped with a thermometer, stirrer, cooler and a $N_2$ inlet. 10% of a monomer mixture consisting of 242.0 g of demineralised water, 28.1 g of sodium lauryl sulphate (30% w/w), 2.53 g ammonium persulphate, 2 g ammonium bicarbonate (25% w/w), 25.3 g acetoacetoxy ethyl methacrylate, 33.7 g methacrylic acid, 421.2 g butylmethacrylate, 154.3 g butylacrylate and 207.9 g styrene was added to the reactor. This mixture was heated to 80° C. under $N_2$ atmosphere and mixed at this temperature for 20 minutes. The remainder of the monomer mixture was added to the reactor over a period of 90 minutes. The reactor content was kept at 80° C. during this period. After the addition was complete, the reactor content was held at 80° C. for another 30 minutes. A solution of 3.08 g of ammonia (25% w/w) and 3.34 g of demineralised water was added to the reactor. The reactor content was held at 80° C. for another 30 minutes. After this the batch was cooled down to room temperature and sieved through a 200 mesh sieve cloth. The pH was 6.5 and the viscosity was 49 mPa.s at 25° C. To 1000 g of this dispersion 2.4 g of 4-(aminomethyl)-1,8-octane diamine (available from BASF) was added as crosslinker.

Navp 9

A Non-autoxidisably Crosslinkable Urethane-acrylic Hybrid Bearing Acetoacetyl Functional Groups in the Acrylic Polymer Stage 1—Synthesis of a Polyurethane Prepolymer An isocyanate terminated urethane prepolymer was prepared as described below: 632 g IPDI (isophorone diisocyanate), 88 g dimethylol propanoic acid (DMPA), 880 g of a polypropylene glycol diol with an average molecular weight of 1600 g/mole (OH number=77.4 mg KOH/g) and 4 drops of Dabco T-9 (a tinoctoate catalyst from Air Products) were added to a 2 liter 3 necked round bottom flask. The mixture was stirred under nitrogen and heated to 95° C. and kept at this temperature until the practical NCO content reached 7.7% (g NCO/ g prepolymer). The batch was cooled down to 70° C. 54.8 g TEA was added to the prepolymer and the mixture was kept at this temperature for 1 hour.

Stage 2—Preparation of a Polyurethane Dispersion From the Polyurethane Prepolymer Prepared in Stage 1

650 g of prepolymer prepared in Stage 1 was added to a water phase consisting of 977.9 g demineralised water and 16.25 g of the surfactant Synperonic NP9 (available from ICI Surfactants). The total addition time was 70 minutes.

When the addition was complete, a mixture of 27.0 g of hydrazine hydrate (63.5%) and 27 g water was added to the dispersion. The temperature of the dispersion increased to 41° C. and was kept at this temperature for 30 minutes. The batch was cooled down to room temperature and sieved through a 200 mesh sieving cloth.

The dispersion had a solids content of 39%, pH was 7.4 and viscosity at 25° C. was 160 mPa.s.

Stage 3—Synthesis of a Not Autoxidisably Crosslinkable Urethane-acrylic Hybrid Bearing Acetoacetyl Functional Groups From the Polyurethane Dispersion of Stage 2

55.6 g butyl methacrylate, 12.2 g methyl methacrylate, 10.1 g acetoacetoxy ethyl methacrylate and 130 g demineralised water were added to 400 g of polyurethane dispersion from Stage 2 and slowly heated to 36° C. Then 0.35 g of a Fe(II)EDTA solution (1% w/w in water), 5.1 g of a tertiary butyl hydroperoxide solution (4.7% w/w in water) and 22.6 g iso-ascorbic acid solution (1% w/w in water) was added. The temperature was increased to 48° C. and was kept on this temperature for 18 minutes and cooled to room temperature. 55.6 g butyl methacrylate, 12.2 g methyl methacrylate, 10.1 g acetoacetoxy ethyl methacrylate and 130 g demineralised water were subsequently added and slowly heated to 31° C. and 22.6 g iso-ascorbic acid solution (1% w/w in water) was added. The temperature was increased to 35° C. and 11.3 g iso-ascorbic acid solution (1% w/w in water) was added and kept on this temperature for 13 minutes and again 11.3 g iso-ascorbic acid solution (1% w/w in water) was added and temperature was kept on 32° C. for 1 hour. The resulting urethane-acrylic hybrid dispersion was cooled down to room temperature and sieved through a 200 mesh sieving cloth. The dispersion had a solids content of 35.2%, pH was 7.8 and viscosity at 25° C. was 40 mPa.s. To 400 g of this dispersion 1.7 g 4-(aminomethyl)-1,8-octane diamine (available from BASF) was added as a crosslinker together with 20 g surfactant Akyporox 111–400V (available from Kao Chemicals GmbH).

Comparative Vinyl Polymers

PREPARATION OF NOT AUTOXIDISABLY CROSSLINKABLE VINYL POLYMERS NOT BEARING ACETOCETYL FUNCTIONAL GROUPS=CVP's 10 to 12

Cvp 10

A not Autoxidsably Crosslinkable Acrylic Dispersion not Bearing Acetoacetyl Functional Groups 911.86 g of demineralised water and 1.82 g of sodium lauryl sulphate (30% w/w) were added to a three necked round bottom flask, equipped with a thermometer, stirrer, cooler and a $N_2$ inlet. The mixture was heated to 70° C. under $N_2$ atmosphere.

5% of a monomer mixture consisting of 188.2 g of demineralised water, 5.45 g of sodium lauryl sulphate, 6.98 g of lauryl mercaptane, 3.49 g of mercapto propionic acid, 43.61 g of methacrylic acid and 392.44 g of methylmethacrylate was added to the reactor. The reactor content was then heated to 80° C.

30% of a solution of ammonium persulphate (87.2 g, 1.5% w/w) in water was added to the reactor. The reactor content was heated to 85° C. and mixed at this temperature for 5 minutes.

The remainder of the monomer mixture was added to the reactor after 60 minutes, the remainder of the ammonium persulphate solution was added to the reactor after 70 minutes. The reactor content was kept at 85° C. during this period. After the addition was complete, the reactor content was held at 85° C. for another 30 minutes.

A solution of 34.50 g of ammonia (25% w/w) and 124.4 g of demineralised water was added to the reactor. The reactor content was held at 85° C. for another 20 minutes. After this the batch was cooled down to room temperature and sieved through a 200 mesh sieve cloth. The pH was 8.3 and the viscosity was 12 mPas at 25° C.

1055.60 g of this polymer dispersion was mixed with 184.15 g of demineralised water for 15 minutes at room temperature. 0.22 g of dimethylethanol amine and 170.34 g of butylmethacrylate and 46.55 g of butylacrylate were added to the reactor, followed by 1.88 g of tert.-butylhydroperoxide (30% solution in water w/w) and 2.86 g of a 1% (w/w) solution of iron ethylene diamine tetraacetate (FeEDTA) in water. The reactor content was heated to 35° C. and mixed for 60 minutes.

2.75 g of a 3.96% (w/w) solution of i-ascorbic acid in water was added and the reactor content was heated to 57° C. in 25 minutes. The batch was held at this temperature for 15 minutes.

Then 37.75 g of a 1.21% (w/w) solution of i-ascorbic acid in water was added to the reactor in 30 minutes at 57° C. The batch was mixed for 15 minutes and cooled down to 35° C.

A mixture of dimethylethanol amine (0.22 g), butyl methacrylate (170.4 g) and butyl acrylate (46.5 g) was added to the reactor. 1.88 g of tert.-butylhydroperoxide (30% solution in water w/w), 2.86 g of a 1% (w/w) solution of FeEDTA in water and 235.77 g of demineralised water were added to the reactor and mixed for 60 minutes at 35° C. 2.75 g of a 3.96% (w/w) solution of i-ascorbic acid in water was added to the reactor content. The batch was heated to 42° C. and mixed at this temperature for 15 minutes.

Then 37.75 g of a 1.21% (w/w) solution of i-ascorbic acid in water was added to the reactor in 30 minutes at 42° C.

The batch was mixed for 30 minutes at 40° C., cooled down to room temperature and sieved through a 200 mesh sieve cloth.

The specifications of this batch were as follows: solids content 35%, pH of 7.9 and viscosity of 24 mPas at 25° C.

Cvp 11

A not Autoxidisably Crosslinkable Acrylic Dispersion not Bearing Acetoacetyl Functional Groups 859.8 g of demineralised water, 14.0 g of sodium lauryl sulphate (30 w/w), 1.69 g ammonium persulphate and 1.03 g of ammonium bicarbonate (25% w/w) were added to a three necked round bottom flask, equipped with a thermometer, stirrer, cooler and a $N_2$ inlet. 10% of a monomer mixture consisting of 242.0 g of demineralised water, 28.1 g of sodium lauryl sulphate (30% w/w), 2.53 g ammonium persulphate, 2 g ammonium bicarbonate (25% w/w), 33.7 g methacrylic acid, 421.2 g butylmethacrylate, 166.1 g butylacrylate and 221.4 g styrene was added to the reactor. This mixture was heated to 80° C. under $N_2$ atmosphere and mixed at this temperature for 20 minutes. The remainder of the monomer mixture was added to the reactor during 90 minutes. The reactor content was kept at 80° C. during this period. After the addition was complete, the reactor content was held at 80° C. for another 30 minutes. A solution of 3.08 g of ammonia (25% w/w) and 3.34 g of demineralised water was added to the reactor. The reactor content was held at 80° C. for another 30 minutes. After this the batch was cooled down to room temperature and sieved through a 200 mesh sieve cloth. The pH was 6.5 and the viscosity was 36 mPa.s at 25° C. To 1000 g of this dispersion 2.4 g of 4-(aminomethyl)-1,8-octane diamine (available from BASF in Germany) was added.

Cvp 12

A not Autoxidisably Crosslinkable Urethane-acrylic Hybrid Dispersion not Bearing Acetoacetyl Functional Groups 66.6 g butyl methacrylate, 11.5 g methyl methacrylate and 130 g demineralised water were added to 400 g of polyurethane dispersion from stage 2 from Example 10 and slowly heated to 35° C. Then 0.35 g of a Fe(II)EDTA solution (1% w/w in water), 5.1 g of a tertiary butyl hydroperoxide solution (4.7% w/w in water) and 22.6 g iso-ascorbic acid solution (1% w/w in water) was added. The temperature was increased to 44° C. and was kept on this temperature for 18 minutes and cooled to room temperature.

66.6 g butyl methacrylate, 11.5 g methyl methacrylate and 130 g demineralised water were subsequently added and slowly heated to 34° C. and 22.6 g iso-ascorbic acid solution (1% w/w in water) was added. 11.3 g iso-ascorbic acid solution (1% w/w in water) was added and kept on this temperature for 13 minutes and again 11.3 g iso-ascorbic acid solution (1% w/w in water) was added and temperature was kept on 33° C. for 1 hour. The resulting urethane-acrylic hybrid dispersion was cooled down to room temperature and sieved through a 200 mesh sieving cloth. The dispersion had a solids content of 35%, pH was 8.2 and the viscosity at 25° C. was 50 mPa.s. To 400 g of this dispersion 1.7 g 4-(aminomethyl)-1,8-octane diamine (available from BASF) was added, together with 20 g surfactant Akyporox 111–400V (available from Kao Chemicals GmbH).

EXAMPLES 1 TO 30 AND COMPARATIVE EXAMPLES CE1 TO CE25

Preparation of compositions according to the invention were carried out by blending at room temperature the autoxidisably crosslinkable organic polymers containing unsaturated fatty acid residues [Fatty AcidS 1 to 5] prepared as described above with the not autoxidisably, crosslinkable vinyl polymers bearing acetoacetyl functional groups NAVP's 6 to 9 prepared as described above. Comparative examples CE1 To CE25 were prepared by blending at room temperature the autoxidisably crosslinkable organic polymers bearing unsaturated fatty acid residues [Fatty AcidS 1 to 5] with not autoxidisably crosslinkable vinyl polymers not bearing acetoacetyl functional groups [CVP's 10 to 12]. The composition and the properties of resultant coatings are shown in Tables 1 to 6.

i) Resistance The blends were cast down on Leneta testcharts Form 2C with a film thickness of 100 μm. The films were dried at room temperature for 20 minutes and at 50° C. for 64 hours. After they were cooled down to room temperature the films were tested for "household chemical resistance".

a) Drops of the various testing liquids (water, ethanol, coffee and "Andy" a commonly used Dutch detergent) were placed on the films and covered with a watch glass. The liquids were removed after 16 hours at room temperature and the damage to the coating was assessed immediately and after four hours recovery. 0 Means that the coating was dissolved, 5 means that the coating was not affected at all.

b) For the hot pan test a drop of boiling water was placed on the film and covered with a beaker containing boiling water for one hour before immediate assessment of the coating. 0 means that the coating was dissolved, 5 means that the coating was not affected at all.

ii) BHMR=Black heel mark resistance: the coating was hit with a black heel and the degree of damage to the coating was assessed the same as the household chemical resistance is assessed.

iii) Yellowness(=Yellow): 0 is very yellow, 5 is a colourless coating.

iv) Hardness Development: The Hardness was measured using a Pendulum Hardness Tester according to the König test method. The larger the value, the harder the film was.

v) Pencil hardness: was measured according to ASTM D3363-929 and H numbers are hard and B numbers are soft on a scale from 8H to HB to B or less.

EXAMPLES 1 AND 2

Blends of Fatty Acid 1 and Navp 6 and Comparative Examples CE1 to CE5: Fatty Acid 1, Navp 6, Cvp 10 and Blends of Fatty Acid 1 and Cvp 10

TABLE 1

| Example | vinyl polymers | FATTY ACID 1/ vinyl polymers ratio (w/w) | BHMR | Yellow | Stain resistances (assessment after 4 hrs) | | | | | | | |
|---|---|---|---|---|---|---|---|---|---|---|---|---|
| | | | | | Water | | EtOH | | Coffee | | Andy | |
| CE1 | None | 100/0 | 5 | 0 | 5* | 5 | 5* | 5 | 4* | 4 | 5* | 5 |
| CE2 | CVP 10 | 0/100 | 1 | 5 | 5* | 5 | 2* | 2 | 4* | 4 | 1* | 1 |
| CE3 | NAVP 6 | 0/100 | 1 | 5 | 3* | 3 | 4* | 4 | 5* | 5 | 4* | 4 |
| CE4 | CVP 10 | 50/50 | 2 | 2 | 5* | 5 | 1* | 1 | 4* | 4 | 2* | 3 |
| 1 | NAVP 6 | 50/50 | 2 | 2 | 5* | 5 | 4* | 5 | 4* | 5 | 4* | 5 |
| CE5 | CVP 10 | 25/75 | 1 | 0 | 5* | 5 | 1* | 1 | 5* | 5 | 0* | 0 |
| 2 | NAVP 6 | 25/75 | 1 | 5 | 5* | 5 | 4* | 5 | 4* | 5 | 5* | 5 |

\* = immediate assessment before recovery

TABLE 2

| Example | vinyl polymers | FATTY ACID 1/ vinyl polymers ratio (w/w) | BHMR | Stain resistances (assessment after 4 hrs) | | | | Hardness Development (room temperature) | | | |
|---|---|---|---|---|---|---|---|---|---|---|---|
| | | | | Water | EtOH | Coffee | Andy | | | | |
| | | | | | | | | 3 hrs | 6 hrs | 1 day | 2 days |
| 3 | NAVP 7 | 25/75 | 4 | 5 | 5 | 2 | 4–5 | 10 | 14 | 49 | 56 |
| 4 | NVAP 7 | 50/50 | 4–5 | 5 | 5 | 4 | 4 | 17 | 27 | 51 | 61 |
| 5 | NAVP 8 | 25/75 | 4–5 | 5 | 5 | 4 | 5 | 10 | 16 | 51 | 59 |
| 6 | NAVP 8 | 50/50 | 3 | 5 | 4 | 3–4 | 3 | 20 | 30 | 54 | 63 |
| CE6 | CVP 11 | 25/75 | 0 | 5 | 4 | 3 | 5 | 11 | 15 | 46 | 49 |
| CE7 | CVP 11 | 50/50 | 0 | 5 | 2 | 4 | 4 | 16 | 26 | 47 | 59 |
| | | | | | | | | 3 hrs | 5 hrs | 7 hrs | 4 days |
| 7 | NAVP 9 | 50/50 | 4 | 5 | 4 | 0–1 | 5 | 50 | 57 | 69 | 67 |
| 8 | NAVP 9 | 25/75 | 5 | 5 | 4 | 0–1 | 5 | 57 | 63 | 69 | 67 |
| CE8 | CVP 12 | 50/50 | 0 | 5 | 3–4 | 1 | 5 | 54 | 60 | 69 | 64 |
| CE9 | CVP 12 | 25/75 | 0 | 4 | 3 | 0–1 | 3–4 | 50 | 56 | 57 | 56 |

TABLE 3

| Example | vinyl polymer | FATTY ACID 4/ vinyl polymer ratio (w/w) | BHMR | Stain resistances (assessment after 4 hrs) | | | | Hardness Development (room temperature) | | | |
|---|---|---|---|---|---|---|---|---|---|---|---|
| | | | | Water | EtOH | Coffee | Andy | 3 hrs | 6 hrs | 1 day | 4 days |
| 9 | NAVP 7 | 50/50 | 3–4 | 4 | 1 | 3 | 2 | tacky | 9 | 63 | 90 |
| 10 | NAVP 7 | 25/75 | 3 | 4–5 | 4 | 2–3 | 3–4 | 9 | 14 | 46 | 80 |
| 11 | NAVP 8 | 50/50 | 3 | 4 | 3 | 2–3 | 3 | tacky | 10 | 59 | 80 |
| 12 | NAVP 8 | 25/75 | 3 | 5 | 3 | 2–3 | 3 | tacky | 7 | 39 | 57 |
| CE10 | CVP 11 | 50/50 | 0 | 2 | 1 | 2 | 3 | tacky | 9 | 34 | 14 |
| CE11 | CVP 11 | 25/75 | 0 | 1–2 | 1 | 2 | 2 | tacky | 9 | 50 | 64 |
| 13 | NAVP 9 | 50/50 | 3–4 | 5 | 4 | 1 | 4–5 | 23 | 29 | 37 | — |
| 14 | NAVP 9 | 25/75 | 1 | 4 | 4 | 0–1 | 4 | 31 | 36 | 40 | — |
| CE12 | CVP 12 | 50/50 | 0 | 5 | 3 | 0–1 | 4 | 23 | 29 | 36 | — |
| CE13 | CVP 12 | 25/75 | 0–1 | 4 | 3 | 0–1 | 3 | 29 | 31 | 37 | — |

— = not measured

TABLE 4

| Example | vinyl polymer | FATTY ACID 3/ vinyl polymer ratio (w/w) | BHMR | Stain resistances (assessment after 4 hrs) | | | | Hardness Development (room temperature) | | |
|---|---|---|---|---|---|---|---|---|---|---|
| | | | | Water | EtOH | Coffee | Andy | 3 hrs | 6 hrs | 1 day |
| 15 | NAVP 7 | 25/75 | 3–4 | 5 | 5 | 2 | 4 | 4 | 4 | 10 |
| 16 | NAVP 7 | 50/50 | 0 | 2 | 1 | 1 | 1 | tacky | tacky | tacky |
| CE14 | CVP 11 | 25/75 | 0 | 5 | 3 | 2 | 3 | tacky | tacky | tacky |
| CE15 | CVP 11 | 50/50 | 0 | 1 | 1 | 1 | 1 | tacky | tacky | tacky |
| 17 | NAVP 9 | 50/50 | 0 | 3 | 3 | 1 | 2 | 11 | 11 | 11 |
| 18 | NAVP 9 | 25/75 | 4 | 4 | 3–4 | 0–1 | 0 | 17 | 17 | 17 |
| CE16 | CVP 12 | 50/50 | 0 | 5 | 4 | 1 | 2 | 14 | 14 | 14 |
| CE17 | CVP 12 | 25/75 | 0 | 4–5 | 3 | 0–1 | 3 | 19 | 19 | 19 |

TABLE 5

| Example | vinyl polymer | FATTY ACID 4/ vinyl polymer ratio (w/w) | BHMR | Stain resistances (assessment after 4 hrs) | | | | Hardness Development (room temperature) | | |
|---|---|---|---|---|---|---|---|---|---|---|
| | | | | hot pan | EtOH | Coffee | Andy | 4 hrs | 1 day | 2 days |
| 19 | NAVP 7 | 50/50 | 5 | 4–5 | 4–5 | 5 | 4–5 | 13 | 33 | 54 |
| 20 | NAVP 7 | 25/75 | 4–5 | 2 | 4–5 | 3–4 | 4 | 9 | 26 | 40 |
| 21 | NAVP 8 | 50/50 | 4–5 | 4 | 5 | 5 | 5 | 10 | 29 | 47 |
| 22 | NAVP 8 | 25/75 | 4 | 3–4 | 5 | 4 | 5 | 6 | 20 | 33 |
| CE 18 | CVP11 | 50/50 | 0 | 4 | 5 | 5 | 5 | 10 | 26 | 44 |
| CE 19 | CVP11 | 25/75 | 0 | 4 | 3 | 4 | 5 | 7 | 19 | 36 |

| Example | vinyl polymer | FATTY ACID 4/ vinyl polymer ratio (w/w) | BHMR | Stain resistances (assessment after 4 hrs) | | | | Hardness Development (room temperature) | | |
|---|---|---|---|---|---|---|---|---|---|---|
| | | | | Water | EtOH | Coffee | Andy | 3 hrs | 6 hrs | 1 day |
| 23 | NAVP 9 | 50/50 | 5 | 5 | 4 | 1 | 5 | 43 | 56 | 71 |
| 24 | NAVP 9 | 25/75 | 5 | 5 | 4 | 1 | 5 | 49 | 54 | 60 |
| CE 20 | CVP12 | 50/50 | 1 | 4 | 2 | 1 | 4–5 | 59 | 63 | 70 |
| CE 21 | CVP12 | 25/75 | 0 | 4–5 | 4 | 0–1 | 5 | 50 | 53 | 59 |

TABLE 6

| Example | vinyl polymer | FATTY ACID 5/ vinyl polymer ratio (w/w) | BHMR | Stain resistances (assessment 4 hrs after recovery) | | | | Hardness Development (room temperature) | | | |
|---|---|---|---|---|---|---|---|---|---|---|---|
| | | | | Water | EtOH | Coffee | Andy | 3 hrs | 6 hrs | 1 day | 4 days |
| 25 | NAVP 7 | 50/50 | 3–4 | 5 | 3 | 2–3 | 3–4 | 17 | 33 | 69 | 89 |
| 26 | NAVP 7 | 25/70 | 4 | 2 | 4 | 4 | 4 | 13 | 29 | 66 | 81 |
| 27 | NAVP 8 | 50/50 | 2 | 5 | 4–5 | 2 | 2 | 14 | 26 | 59 | 81 |
| 28 | NAVP 8 | 25/75 | 2–3 | 0 | 3 | 2–3 | 2–3 | 11 | 21 | 46 | 64 |
| CE22 | CVP 11 | 50/50 | 0–1 | 1 | 1 | 2 | 0–1 | 16 | 29 | 59 | 73 |
| CE23 | CVP 11 | 25/75 | 0 | 0 | 2 | 2–3 | 0 | 10 | 23 | 49 | 61 |
| 29 | NAVP 9 | 50/50 | 3 | 5 | 4 | 1 | 5 | 43 | 50 | 54 | 59 |
| 30 | NAVP 9 | 25/75 | 4 | 5 | 4 | 0–1 | 5 | 46 | 50 | 50 | 54 |

TABLE 6-continued

| Example | vinyl polymer | FATTY ACID 5/ vinyl polymer ratio (w/w) | BHMR | Stain resistances (assessment 4 hrs after recovery) | | | | Hardness Development (room temperature) | | | |
| --- | --- | --- | --- | --- | --- | --- | --- | --- | --- | --- | --- |
| | | | | Water | EtOH | Coffee | Andy | 3 hrs | 6 hrs | 1 day | 4 days |
| CE24 | CVP 12 | 50/50 | 1 | 3–4 | 2 | 1 | 5 | 46 | 53 | 61 | 63 |
| CE25 | CVP 12 | 25/75 | 1 | 5 | 3 | 0–1 | 5 | 49 | 53 | 59 | 59 |

What is claimed is:

1. An aqueous crosslinkable coating composition comprising as aqueous dispersed components:

(i) at least one autoxidisably crosslinkable organic polymer containing unsaturated fatty acid residues, and (ii) at least one vinyl polymer which is not autoxidisably crosslinkable and bears acetoacetyl functional groups, and wherein said composition has present therein carbonyl-reactive amine and/or hydrazine derivative functional groups which impart crosslinkability to component (ii).

2. A composition according to claim 1 wherein component (i) is a polyurethane polymer.

3. A composition according to claim 2 wherein the polyurethane polymer has been formed by the chain extension of an isocyanate-terminated polyurethane prepolymer with an active hydrogen chain extending compound.

4. A composition according to any one of claims 1 to 3 wherein said vinyl polymer-borne acetoacetyl functional groups are provided by acetoacetate groups of formula

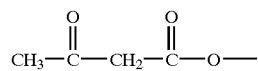

or by acetoacetoacetamide groups of formula

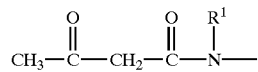

or by 1,3-diketone groups of formula

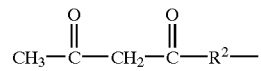

wherein $R^1$ is hydrogen or a monovalent hydrocarbyl radical, and where $R^2$ is a divalent hydrocarbyl radical.

5. A composition according to any one of claims 1 to 3 wherein the functional amine or hydrazine groups are provided by polyamines or polyhydrazines which are not part of the autoxidisably crosslinkable organic polymer or of the vinyl polymer.

6. A composition according to any one of claims 1 to 3 wherein the hydrazine functional group comprises hydrazine, hydrazone or hydrazide groups.

7. A composition according to any one of claims 1 to 3 wherein the hydrazine functional groups are provided by compounds selected from dicarboxylic acid bis-hydrazides and hydrazones derived therefrom, carbonic acid hydrazides and bis-semicarbazides.

8. A composition according to any one of claims 1 to 3 wherein the autoxidisably crosslinkable polymer containing unsaturated fatty acid residues also bears chain-pendant amine or hydrazine derivative functional groups.

9. A composition according to any one of claims 1 to 3 wherein the vinyl polymer also bears chain pendant amine or hydrazine derivative functional groups.

10. A composition according to any one of claims 1 to 3 wherein the ratio of component (i) to component (ii) is from 90:10 to 10:10.

11. A coated substrate having a coating obtained from an aqueous crosslinkable coating composition as claimed in any one of claims 1 to 3.

12. The method which comprises coating an aqueous crosslinkable coating composition as claimed in any one of claims 1 to 3 onto a substrate.

* * * * *